United States Patent [19]

Gain, Jr.

[11] Patent Number: 4,497,340

[45] Date of Patent: Feb. 5, 1985

[54] SEAL FOR POST INDICATOR VALVE ASSEMBLY

[75] Inventor: Lorand H. Gain, Jr., Montgomery, Ill.

[73] Assignee: AMSTED Industries Incorporated, Chicago, Ill.

[21] Appl. No.: 460,476

[22] Filed: Jan. 24, 1983

[51] Int. Cl.³ .................................................. F16K 37/00
[52] U.S. Cl. ........................................ 137/556; 116/277; 277/184; 277/206 R; 251/214
[58] Field of Search ............... 277/206 R, 206 A, 184; 137/553, 556; 116/277; 251/353, 214

[56] References Cited

U.S. PATENT DOCUMENTS

| 2,420,039 | 5/1947 | Frisby | 277/184 |
|---|---|---|---|
| 3,238,915 | 3/1966 | Smith et al. | 116/277 |
| 3,452,766 | 7/1969 | Fenster | 137/556 |
| 3,554,160 | 1/1971 | Fortune et al. | 116/277 |
| 3,689,081 | 9/1972 | Kinberg | 277/206 R |
| 3,804,056 | 4/1974 | Lee et al. | 116/277 |
| 3,837,619 | 9/1974 | Sherman | 251/353 |
| 4,068,852 | 1/1978 | Anglade | 277/206 R |
| 4,448,148 | 5/1984 | Gain | 137/556 |

Primary Examiner—A. Michael Chambers
Attorney, Agent, or Firm—Charles E. Bouton; Fred P. Kostka

[57] ABSTRACT

This invention relates to a post indicating valve assembly and more specifically to an orienting means formed at the end of an operating shaft to provide a reference in determining the closure member positions. An indicator means having a complementary socket means is provided to slidably accommodate the orienting means for support thereon. A seal means having annular lip means is constructed and arranged to provide a sealing engagement about the periphery of the operating shaft.

6 Claims, 4 Drawing Figures

SEAL FOR POST INDICATOR VALVE ASSEMBLY

BACKGROUND OF THE INVENTION

1. Field of Invention

The present invention relates to a valve indicator and more particularly to an indicator of the type which indicates the open and closed positions of a valve located below ground level.

2. Prior Art

The typical valve with which the indicator of the present invention is used, is a butterfly valve buried underground in a water line system. Such butterfly valve is movable through 90° between an open and closed position. To indicate the open and closed positions, an indicator is attached to the valve operator. The indicator moves relative to a stationary mounted element or reference point to provide a visual indication of the valve position.

In one such arrangement, the stationary reference point is in the form of a hollow cylindrical housing having diametrically located sighting openings formed therein. The indicator movable with the valve is in the form of a post disposed within the housing and having diametrically extending opening alignable with the cylindrical wall openings. In the open position of the valves, the indicator post opening is aligned with the reference housing openings. In this manner, the visual inspection is easily made from a distance because the inspector may sight through the aligned openings. In the closed or partially closed position of the valve, a portion or all of the indicating post blocks the visibility through the reference openings.

These indicators may be located above ground in areas subject to either vehicle traffic such as tractors, trucks or the like. As a result, the indicators extending above the ground level may be broken off or damaged resulting in the improper or no indication of the valve position.

Heretofore it has been the common practice to permanently attach the indicator post as an extension of the valve operating shaft. In such an arrangement, the extension is sealed from the valve operating shaft to prevent leakage. The sealing has been accomplished by a resilient seal which is compressed by the indicating post which is pinned or otherwise permanently fastened to the extentions. While this arrangement is generally satisfactory in a few instances, as a result of vandalism or a vehicle striking the housing with the reference openings so as to break it off, the post remained erect on the control shaft of the valve. Under these conditions, a sighting is made through the indicator opening without the knowledge that the reference housing is removed and thereby resulting in a false indication.

SUMMARY OF THE INVENTION

By the present invention it is proposed to provide an indicator assembly which alleviates the possibility of a false indication.

This is accomplished generally by an indicator assembly which is constructed so as to eliminate the necessity of pinning the indicator post to the indicator extention. To this end the indicator assembly comprises generally a reference housing having the diametrically opposed sight openings formed therein fixed to the valve assembly. A control shaft extension projects into the reference housing and disposed about the extension shaft to provide a fluid tight seal at the entry of the extention into the reference housing is a gasket. The gasket is provided along one face with inclined annular lip defining an opening less than the diameter of the extention shaft. The lip is flexible so as to yield when the shaft is inserted into the gasket opening whereby the inner edges thereof resiliently and tightly embrace the shaft to form a seal. An indicator post is provided with an axial base which is seated on the extension and rests above the lip of the gasket. The weight or mass of the post is sufficient to retain the post on the extention so that fastening means are not required. Thus in the event that the outer reference housing is subjected to a force causing it to break, the same force is effective to also displace the indicator post from its seating engagement on the indicator shaft. This renders it impossible or at least highly unlikely that a false indication can occur upon a visual inspection.

DESCRIPTION OF THE PREFERRED EMBODIMENT

Figure 1:
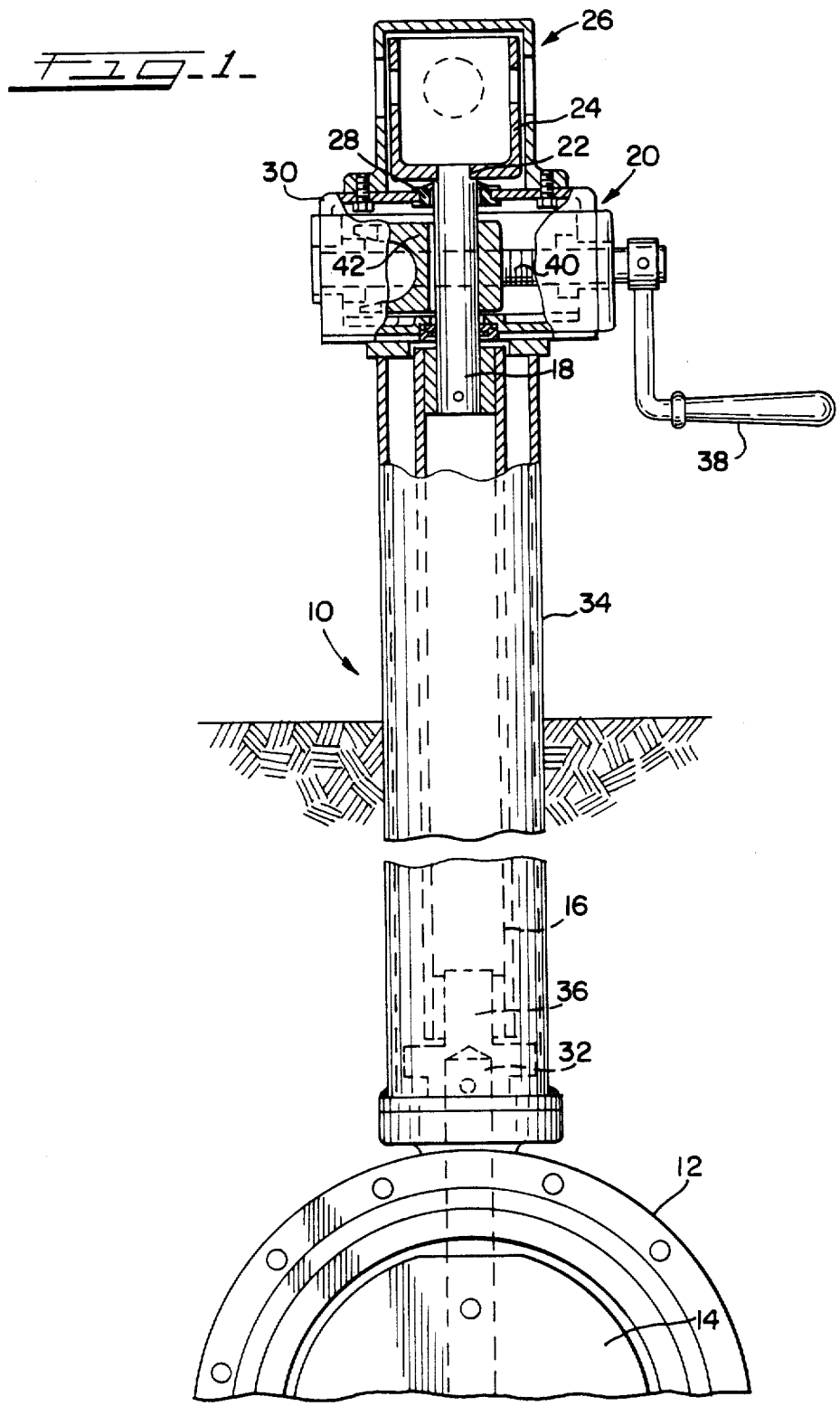
FIG. 1 is a partial elevational view of a valve assembly embodying the structures of the invention, a portion of the assembly is broken away to show underlying details of the structures.

Referring now to the drawings, in particular to FIG. 1, there is shown a valve assembly 10 embodying the structures of the invention. The valve assembly 10 generally comprises a valve body 12 having a closure member or butterfly valve disk 14 and connected in line with a buried pipeline (not shown). An operating shaft 16 is connected at one end to the valve disk 14 and the other end to an extension shaft 18 extending through a manual operator assembly 20. The operator assembly 20 serves to impart rotational movement to the operating shaft 16 and to turn valve disk 14 between an open and closed position. The extension shaft 18 projects above an operator housing 30 and includes a plurality of flats 22 formed at the upper end thereof to mount to an inner member or post 24 of an indicator assembly 26. A seal 28 is provided in the operator housing 30 to seal about the periphery of the extension shaft 18.

FIG. 1 shows the partial structure of the valve body 12 connected in line with the buried pipeline (not shown). The valve disk 14 is disposed in the valve body 12 in the conventional manner and is rotatable about a shaft 32 extending beyond the body 12. The closure member 14 may be rotated between a closed position wherein closure member 14 is in sealing engagement with the valve body 12 and an open position wherein liquid may flow through the body 12.

A cylindrical housing 34 is fixed to the valve body 12 and accommodates the control or operating shaft 16 which is connected to valve by an adapter 36. The opposite end of the cylindrical housing 34 is fixed to an operator housing 30 which houses the lower end of the extension shaft 18. The operator shaft 16 is concentrically disposed in the cylindrical housing 34 and is fixedly secured to the extension shaft 18 at one end and the adapter 36 at the other.

The operator assembly 20 generally comprises the housing 30 supported on the cylindrical housing 34. The extension shaft 18 extends through the housing 30 with its ends projecting beyond the housing 30. A handle 38 positioned externally to the housing 30 is connected to a driving screw 40. An externally threaded driven collar 42 meshes with the driving screw 40 and is fixedly connected to the center portion of the extension shaft 18. Upon rotation of the handle 38, the screw meshing with the collar 42 is rotated whereby the shaft or extension 18 is also rotated. This causes the operating shaft 16 to also rotate and turn the valve between its open and closed position.

Figure 2:
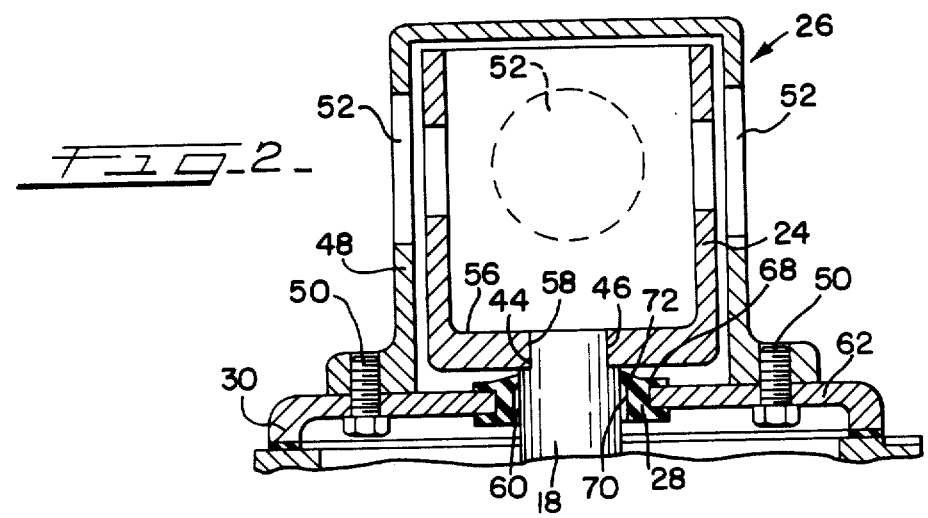
FIG. 2 is a cross sectional view of the indicator.

The extension shaft 18 as disclosed heretofore generally is of solid cylindrical structure. As best seen in FIG. 2, the upper end portion of the extension shaft 18 projects above the operator housing 30. A pair of opposite flat surfaces 44 and 46 are formed at the upper end of the extension shaft 18 to seat within a socket of the movable indicating member 24, details of which to be described hereinafter. Since the extension shaft 18 is fixedly secured to the operating shaft 16, which is fixed to the adapter 36 of the closure member shaft 32, the orientation of the flat surfaces 44 and 46 provide a reference of the position of the closure member 14.

As shown in FIG. 2, the indicator assembly 26 is supported on the operator housing 30. Indicator assembly 26 comprises a fixed outer member 48 having an inverted cup configuration. The outer member 48 is fixedly secured to the operator housing 30 by screw 50 or the like. A plurality of opposite openings 52 are formed on the wall portion of the outer member 48 to permit visual observation of an inner member 24 therethrough. The cup-shaped inner member 24 is disposed in the outer member and is concentrically rotatable relative thereto. A plurality of opposite openings 54 are formed on the wall of the inner member 24 for reasons to be disclosed below. The bottom wall 56 of the inner member 24 includes a socket 58 having a circular configuration with a pair of opposite segments to define a pair of flat surfaces. The socket 58 is constructed and arranged so that it can slidably accommodate the flat surfaces end of the extension shaft 18. It should be noted that the extension shaft 18 is snuggly fitted in the socket 58 such that the inner member 24 is supported on the extension shaft 18.

Figure 3:
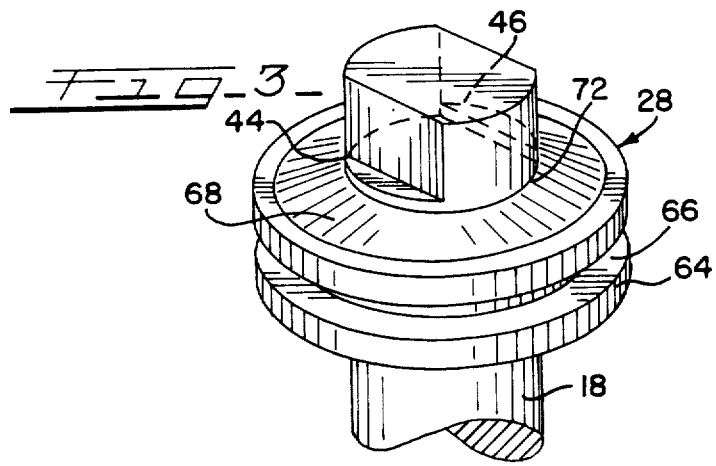
FIG. 3 is a perspective view of a resilient ring of the present invention positioned about the periphery of the operating shaft.
Figure 4:
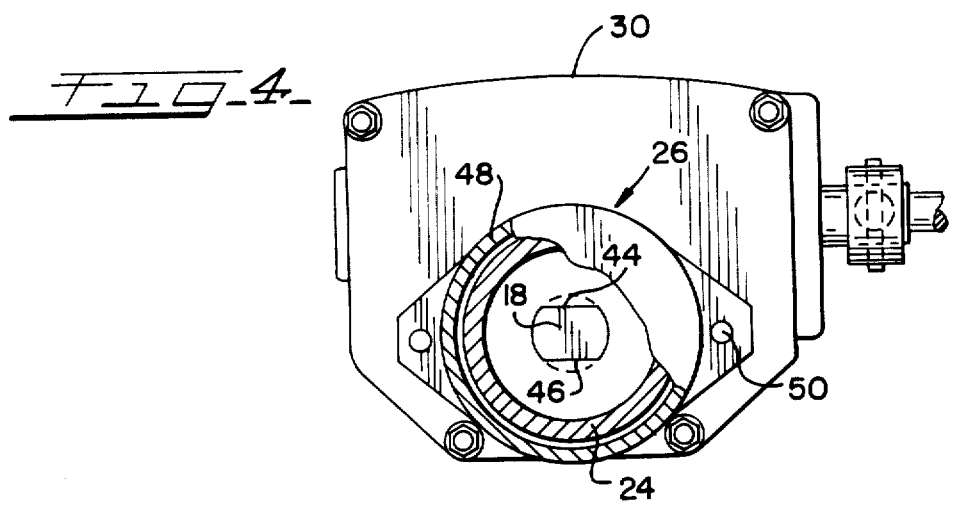
FIG. 4 is a plan view of the operator housing with parts broken away to show underlying details of the structure.

As seen in FIG. 2, the extension shaft 18 projects through an opening 60 provided in the top wall 62 of the operator housing 30. A resilient seal 28 is provided in the opening 60 and comprising an annular body 64 (FIG. 3) having an annular groove 66. The operator housing top wall 62 is seated in the groove 66 to provide a seal therebetween.

Referring again to FIG. 2, the seal body 64 includes an upwardly inclined top wall 68 and merges with the inner wall 70 to form an annular lip 72. The extension shaft 18 projects through the core of the seal 28 so that the lip 72 is in resilient sealing engagement with the shaft periphery. It should be noted that the diameter of the lip 72 is slightly less than the diameter of the extension shaft 18 so as to provide an effective and resilient seal therewith. It is also apparent that the bottom wall 56 of the inner indicator member 24 is not in contact with the seal 28 so that in the absence of the member 24, the seal 28 may still provide an effective seal between the extension shaft 18 and the indicator housing 30.

What is claimed is:

1. A valve assembly comprising:
   a body having a flow passage for a fluid therethrough;
   a closure member disposed in said body for movement between a closed position to shut off the flow of said fluid and open position to permit the flow of said fluid through said flow passage;
   operating shaft means having one end thereof connected to said closure member and the other extending beyond said body for remote operation of said closure member between said positions;
   an extension shaft fixedly secured to said other end of said operating shaft for rotational movement therewith;
   a valve operator housing disposed about said extension shaft including operating means for turning said extension shaft;
   seal means carried by said valve operator housing and disposed about said extension shaft and having annular lip means sealing engagable with the periphery of said extension shaft to prevent leakage between said extension shaft and said valve operator housing;
   orienting means formed on the extension shaft end opposite said operating shaft to provide a reference for determining the position of said valve closure member in said flow passage;
   indicator means having socket means complementary to said orienting means on said extension shaft for visually indicating the position of said closure member, said socket means slidably accommodates said orienting means for support thereon;
   an indicator housing fixedly secured to said valve operator housing and having reference means alignable with said indicator means for remotely disclosing said positions of said closure member.

2. The invention as described in claim 1 wherein said orienting means includes a plurality of longitudinally extending flat surfaces.

3. The invention as described in claim 1 wherein said seal means is free of contact with said indicator means.

4. The invention as described in claim 1 wherein said seal means comprises a cylindrical and resilient body having a bore defined by an inner wall, an inclined top wall formed at one end of said body, said body including an outer wall having an annularly recessed groove, said top wall merges with said inner wall to form said annular lip means, wherein said groove and said lip means is respectively and sealingly engagable with said valve operating housing and said extension shaft.

5. The invention as described in claim 4 wherein said lip means includes a circular opening having a cross sectional area less than the cross sectional area of said extension shaft.

6. The valve assembly of claim 1 wherein the said indicator means is slidingly retained on the said extension shaft by weight and without pins so that it may be displaced therefrom by a force sufficient to break the said indicator housing from the said operator housing.

* * * * *

UNITED STATES PATENT AND TRADEMARK OFFICE
CERTIFICATE OF CORRECTION

PATENT NO. : 4,497,340

DATED : August 7, 1990

INVENTOR(S) : Norman J. Marchant and John P. Morgan

It is certified that error appears in the above-identified patent and that said Letters Patent is hereby corrected as shown below:

In Column 8, line 54, change "13" to --15--.

Signed and Sealed this

Eighth Day of March, 1994

*Attest:*

BRUCE LEHMAN

*Attesting Officer*     *Commissioner of Patents and Trademarks*